(12) United States Patent
Izumida et al.

(10) Patent No.: US 11,892,048 B2
(45) Date of Patent: Feb. 6, 2024

(54) SPRING STEEL WIRE

(71) Applicant: Sumitomo Electric Industries, Ltd., Osaka (JP)

(72) Inventors: Hiromu Izumida, Osaka (JP); Yoshiki Natsumeda, Osaka (JP); Taichi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 613 days.

(21) Appl. No.: 17/058,282

(22) PCT Filed: Jun. 15, 2020

(86) PCT No.: PCT/JP2020/023360
§ 371 (c)(1),
(2) Date: Nov. 24, 2020

(87) PCT Pub. No.: WO2021/255776
PCT Pub. Date: Dec. 23, 2021

(65) Prior Publication Data
US 2022/0186803 A1    Jun. 16, 2022

(51) Int. Cl.
*C22C 38/02* (2006.01)
*F16F 1/02* (2006.01)
(Continued)

(52) U.S. Cl.
CPC .............. *F16F 1/021* (2013.01); *C21D 6/002* (2013.01); *C21D 6/005* (2013.01); *C21D 6/008* (2013.01);
(Continued)

(58) Field of Classification Search
CPC .......... F16F 1/021; C22C 38/02; C22C 38/04; C22C 38/18; C21D 2211/009
(Continued)

(56) References Cited

U.S. PATENT DOCUMENTS

2004/0244883 A1    12/2004  Onoda
2006/0201588 A1     9/2006  Suda et al.
(Continued)

FOREIGN PATENT DOCUMENTS

EP      3492616 A1    6/2019
JP    S58-136780 A    8/1983
(Continued)

OTHER PUBLICATIONS

Non-Final Office Action issued in U.S. Appl. No. 17/058,459, dated Dec. 13, 2022.
(Continued)

*Primary Examiner* — Matthew D Matzek
(74) *Attorney, Agent, or Firm* — McCarter & English, LLP; Michael A. Sartori

(57) ABSTRACT

A spring steel wire includes a main body made of a steel and having a line shape, and an oxidized layer covering an outer peripheral surface of the main body. The steel constituting the main body contains not less than 0.5 mass % and not more than 0.7 mass % C, not less than 1 mass % and not more than 2.5 mass % Si, not less than 0.2 mass % and not more than 1 mass % Mn, and not less than 0.5 mass % and not more than 2 mass % Cr, with the balance being Fe and unavoidable impurities. The steel constituting the main body has a pearlite structure. The oxidized layer has a thickness of not less than 2 μm and not more than 5 μm. The oxidized layer contains not less than 60 mass % $Fe_3O_4$.

7 Claims, 5 Drawing Sheets

(51) Int. Cl.
*C21D 6/00* (2006.01)
*C21D 9/52* (2006.01)
*C22C 38/04* (2006.01)
*C22C 38/18* (2006.01)

(52) U.S. Cl.
CPC .............. *C21D 9/525* (2013.01); *C22C 38/02* (2013.01); *C22C 38/04* (2013.01); *C22C 38/18* (2013.01); *C21D 2211/009* (2013.01); *F16F 2224/0208* (2013.01)

(58) Field of Classification Search
USPC ........................................................ 428/384
See application file for complete search history.

(56) References Cited

U.S. PATENT DOCUMENTS

| | | |
|---|---|---|
| 2007/0137741 A1 | 6/2007 | Yoshihara |
| 2008/0279714 A1 | 11/2008 | Hashimura et al. |
| 2009/0065105 A1 | 3/2009 | Kochi et al. |
| 2009/0269578 A1 | 10/2009 | Takeda et al. |
| 2014/0193288 A1 | 7/2014 | Teramoto et al. |
| 2016/0348221 A1 | 12/2016 | Sugimura et al. |
| 2018/0320255 A1 | 11/2018 | Sugimura et al. |

FOREIGN PATENT DOCUMENTS

| | | |
|---|---|---|
| JP | H08-39416 A | 2/1996 |
| JP | 2004-052048 A | 2/2004 |
| JP | 2004-115859 A | 4/2004 |
| JP | 2004-315968 A | 11/2004 |
| JP | 2006-028619 A | 2/2006 |
| JP | 2006-183136 A | 7/2006 |
| JP | 2006-342400 A | 12/2006 |
| JP | 2007-169688 A | 7/2007 |
| JP | 2008-266725 A | 11/2008 |
| JP | 2009-68030 A | 4/2009 |
| JP | 2009-235523 A | 10/2009 |
| JP | 2009-263750 A | 11/2009 |
| JP | 2012-077367 A | 4/2012 |
| JP | 2014-169470 A | 9/2014 |
| JP | 2017-115228 A | 6/2017 |
| JP | 2018-12868 A | 1/2018 |
| JP | 2018012868 A * | 1/2018 |
| KR | 20140010700 A * | 9/2018 |
| WO | 2013/024876 A1 | 2/2013 |
| WO | 2015/115574 A1 | 8/2015 |
| WO | 2018/021574 A1 | 2/2018 |

OTHER PUBLICATIONS

Final Office Action issued in U.S. Appl. No. 17/058,459, dated Mar. 28, 2023.

Advisory Action issued in U.S. Appl. No. 17/058,459, dated Jul. 14, 2023.

Notice of Allowance issued in U.S. Appl. No. 17/058,459, dated Sep. 6, 2023.

* cited by examiner

SPRING STEEL WIRE

TECHNICAL FIELD

The present disclosure relates to a steel wire for mechanical springs.

BACKGROUND ART

Oil quenched and tempered wires (spring steel wires) having an oxidized layer on the outer peripheral surface for the purposes of securing lubricity during the coiling process are known (see, for example, Japanese Patent Application Laid-Open No. 2004-052048 (Patent Literature 1), Japanese Patent Application Laid-Open No. 2004-115859 (Patent Literature 2), Japanese Patent Application Laid-Open No. 2017-115228 (Patent Literature 3), and Japanese Patent Application Laid-Open No. 2018-012868 (Patent Literature 4)).

CITATION LIST

Patent Literature

Patent Literature 1: Japanese Patent Application Laid-Open No. 2004-052048
Patent Literature 2: Japanese Patent Application Laid-Open No. 2004-115859
Patent Literature 3: Japanese Patent Application Laid-Open No. 2017-115228
Patent Literature 4: Japanese Patent Application Laid-Open No. 2018-012868

SUMMARY OF INVENTION

A spring steel wire according to the present disclosure includes a main body made of a steel and having a line shape, and an oxidized layer covering an outer peripheral surface of the main body. The steel constituting the main body contains not less than 0.5 mass % and not more than 0.7 mass % C (carbon), not less than 1.0 mass % and not more than 2.5 mass % Si (silicon), not less than 0.2 mass % and not more than 1.0 mass % Mn (manganese), and not less than 0.5 mass % and not more than 2.0 mass % Cr (chromium), with the balance being Fe (iron) and unavoidable impurities. The steel constituting the main body has a pearlite structure. The oxidized layer has a thickness of not less than 2 μm and not more than 5 μm. The oxidized layer contains not less than 60 mass % $Fe_3O_4$.

DESCRIPTION OF EMBODIMENTS

Figure 1:
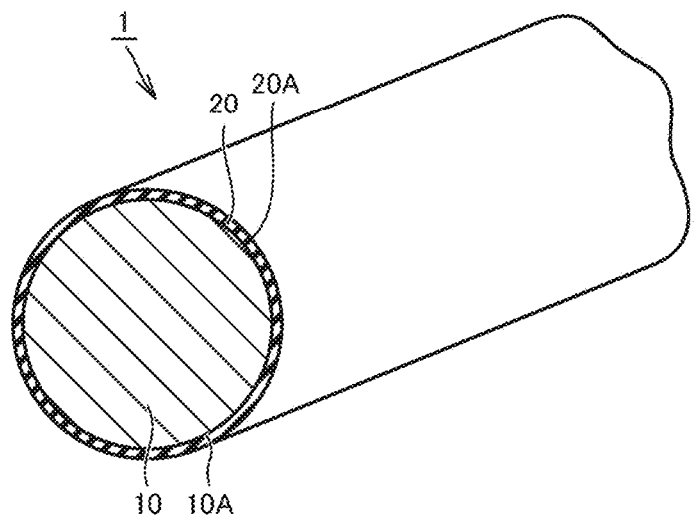
FIG. 1 is a schematic diagram showing the structure of a spring steel wire.

Problem to be Solved by the Present Disclosure

As explained above, a technique of securing lubricity at the time of coiling an oil quenched and tempered wire as a spring steel wire into a spring by covering the outer peripheral surface of the wire with an oxidized layer is known. The steel constituting the oil quenched and tempered wire has a tempered martensite structure. The tempered martensite structure includes a matrix of martensitic phase and fine carbides dispersed in the matrix. Covering the surface of the steel wire having such a tempered martensite structure with an oxidized layer can secure lubricity during the coiling process.

On the other hand, a hard-drawn wire may be used as a spring steel wire. The steel constituting the hard-drawn wire has a pearlite structure. The pearlite structure having alternately laminated ferrite and cementite ($Fe_3C$) layers is considerably different from the above-described tempered martensite structure. Therefore, for the hard-drawn wire, it is necessary to consider a way of securing lubricity suitable for the pearlite structure. In view of the foregoing, one object of the present disclosure is to provide a spring steel wire of hard-drawn wire that is excellent in lubricity when subjected to the coiling process.

Advantageous Effects of the Present Disclosure

The spring steel wire according to the present disclosure can provide a spring steel wire of hard-drawn wire that ensures excellent lubricity during the coiling process.

DESCRIPTION OF EMBODIMENTS OF THE PRESENT DISCLOSURE

Firstly, embodiments of the present disclosure will be listed and described. A spring steel wire according to the present disclosure includes a main body made of a steel and having a line shape, and an oxidized layer covering an outer peripheral surface of the main body. The steel constituting the main body contains not less than 0.5 mass % and not more than 0.7 mass % C (carbon), not less than 1.0 mass % and not more than 2.5 mass % Si (silicon), not less than 0.2 mass % and not more than 1.0 mass % Mn (manganese), and not less than 0.5 mass % and not more than 2.0 mass % Cr (chromium), with the balance being Fe (iron) and unavoidable impurities. The steel constituting the main body has a pearlite structure. The oxidized layer has a thickness of not less than 2 μm and not more than 5 μm. The oxidized layer contains not less than 60 mass % $Fe_3O_4$.

The structure of the steel constituting the main body of the spring steel wire of the present disclosure is the pearlite structure. That is, the spring steel wire of the present disclosure is a hard-drawn wire. In the spring steel wire of the present disclosure, the main body having the pearlite structure has its outer peripheral surface covered with the oxidized layer having a thickness of not less than 2 μm and not more than 5 μm. The oxidized layer contains at least 60 mass % $Fe_3O_4$. According to the studies conducted by the present inventors, when the oxidized layer contains at least 60 mass % $Fe_3O_4$, the peeling of the oxidized layer from the main body having the pearlite structure is suppressed and high lubricity is ensured during the coiling process.

As described above, the spring steel wire according to the present disclosure provides a spring steel wire of hard-drawn wire that is excellent in lubricity when subjected to the coiling process. The oxidized layer contains preferably 70 mass % or more $Fe_3O_4$ and more preferably 80 mass % or more $Fe_3O_4$.

The reasons for limiting the component composition of the steel constituting the main body to the above-described ranges will be described below.

Carbon (C): Not Less than 0.5 Mass % and not More than 0.7 Mass %

Carbon is an element that greatly affects the strength of the steel. For achieving sufficient strength as a spring steel wire, the carbon content is required to be not less than 0.5 mass %. On the other hand, an increased carbon content may reduce toughness, making working difficult. For ensuring sufficient toughness, the carbon content is required to be not more than 0.7 mass %. For improving the toughness and facilitating the working, the carbon content may be not more than 0.6 mass %.

Silicon (Si): Not Less than 1 Mass % and not More than 2.5 Mass %

Silicon has a property of suppressing softening due to heating (resistance to softening). For suppressing softening due to heating at the time of coiling the spring steel wire into a spring as well as at the time of using the spring, the silicon content is required to be not less than 1 mass %, and it may be not less than 1.2 mass %. On the other hand, silicon added in an excessive amount will degrade toughness. For ensuring sufficient toughness, the silicon content is required to be not more than 2.5 mass %. From the standpoint of focusing on the toughness, the silicon content may be not more than 2 mass % or not more than 1.6 mass %.

Manganese (Mn): Not Less than 0.2 Mass % and not More than 1 Mass %

Manganese is an element added as a deoxidizing agent at the time of steelmaking. To achieve the function as the deoxidizing agent, the manganese content is required to be not less than 0.2 mass %, and it may be not less than 0.5 mass %. On the other hand, manganese added in an excessive amount will reduce toughness and degrade workability in hot working. Thus, the manganese content is required to be not more than 1 mass %, and it may be not more than 0.9 mass %.

Chromium (Cr): Not Less than 0.5 Mass % and not More than 2 Mass %

Chromium functions as a carbide-forming element in the steel, and contributes to the refinement of the metal structure as a result of formation of fine carbides and also contributes to the suppression of softening during heating. To ensure that these effects are achieved, chromium is required to be added in an amount of not less than 0.5 mass %. On the other hand, chromium added in an excessive amount will cause degradation of toughness. Thus, the amount of chromium added needs to be not more than 2 mass %. From the standpoint of focusing on the toughness, the amount of chromium added may be not more than 1.5 mass % or not more than 1 mass %.

Unavoidable Impurities

During the process of producing the steel constituting a spring steel wire, phosphorus (P), sulfur (S), etc. are inevitably mixed into the steel. Phosphorus and sulfur contained in an excessive amount will cause grain boundary segregation and produce inclusions, thereby degrading the properties of the steel. Therefore, the phosphorus content and sulfur content are each preferably not more than 0.025 mass %. Further, the total content of the unavoidable impurities is preferably not more than 0.3 mass %.

In the spring steel wire described above, the oxidized layer may include a first $Fe_3O_4$ layer, and a second $Fe_3O_4$ layer covering an outer peripheral surface of the first $Fe_3O_4$ layer. The first $Fe_3O_4$ layer may have a Si concentration higher than a Si concentration of the second $Fe_3O_4$ layer and a Si concentration of the main body. The presence of the first $Fe_3O_4$ layer having a high Si concentration between the second $Fe_3O_4$ layer and the main body further suppresses the peeling of the oxidized layer from the main body.

In the spring steel wire described above, the oxidized layer may further include a FeO layer between the first $Fe_3O_4$ layer and the main body. The state of oxidation to the extent that the FeO layer is formed between the first $Fe_3O_4$ layer and the main body can suppress formation of a $Fe_2O_3$ layer that peels off easily.

In the spring steel wire described above, although the FeO layer may cover the entire outer peripheral surface of the main body, the FeO layer preferably partially covers the outer peripheral surface of the main body. In a portion of the main body where its outer peripheral surface is not covered with the FeO layer, the main body and the first $Fe_3O_4$ layer are preferably in contact with each other. Such a configuration further suppresses the peeling of the oxidized layer from the main body.

In the spring steel wire described above, the first $Fe_3O_4$ layer may have a Si concentration of not less than 2.5 mass % and not more than 6 mass % and a Cr concentration of not less than 1.5 mass % and not more than 3 mass %. Such a configuration further suppresses the peeling of the oxidized layer from the main body.

In the spring steel wire described above, the first $Fe_3O_4$ layer may have a thickness of not less than 0.3 µm and not more than 1.5 µm. Such a configuration further suppresses the peeling of the oxidized layer from the main body.

DETAILS OF EMBODIMENTS OF THE PRESENT INVENTION

Embodiments of the spring steel wire according to the present disclosure will be described below with reference to the drawings. In the following drawings, the same or corresponding parts are denoted by the same reference numerals, and the description thereof will not be repeated.

Embodiment 1

Figure 2:
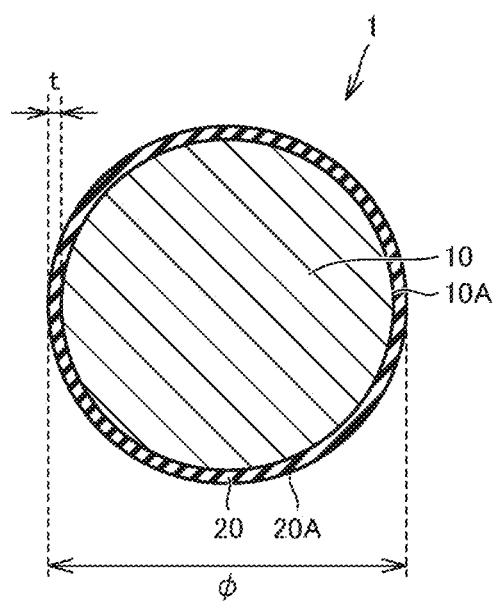
FIG. 2 is a schematic cross-sectional view showing the structure of the spring steel wire.

FIG. 1 is a schematic diagram showing the structure of a spring steel wire. FIG. 2 is a schematic cross-sectional view showing the structure of the spring steel wire. FIG. 2 shows a cross section perpendicular to the longitudinal direction of the spring steel wire.

Referring to FIGS. 1 and 2, a spring steel wire 1 according to the present embodiment includes a main body 10 made of a steel and having a line shape, and an oxidized layer 20 covering an outer peripheral surface 10A of the main body 10. The oxidized layer 20 has an outer peripheral surface 20A that constitutes an outer peripheral surface of the spring steel wire 1. Referring to FIG. 2, the spring steel wire 1 has a diameter φ of, for example, not less than 2.0 mm and not more than 8.0 mm. The oxidized layer 20 has a thickness t of not less than 2 µm and not more than 5 µm.

The steel constituting the main body 10 contains not less than 0.5 mass % and not more than 0.7 mass % C, not less than 1 mass % and not more than 2.5 mass % Si, not less than 0.2 mass % and not more than 1 mass % Mn, and not less than 0.5 mass % and not more than 2 mass % Cr, with the balance being Fe and unavoidable impurities. The steel constituting the main body 10 may have a component composition equivalent to JIS SWOSC-V. The steel constituting the main body 10 may be, for example, SAE 9254V.

The steel constituting the main body 10 may be one based on such a steel grade, with C increased in amount within the above-described component composition range. The steel constituting the main body 10 has a pearlite structure. The spring steel wire 1 is a hard-drawn wire.

Figure 3:
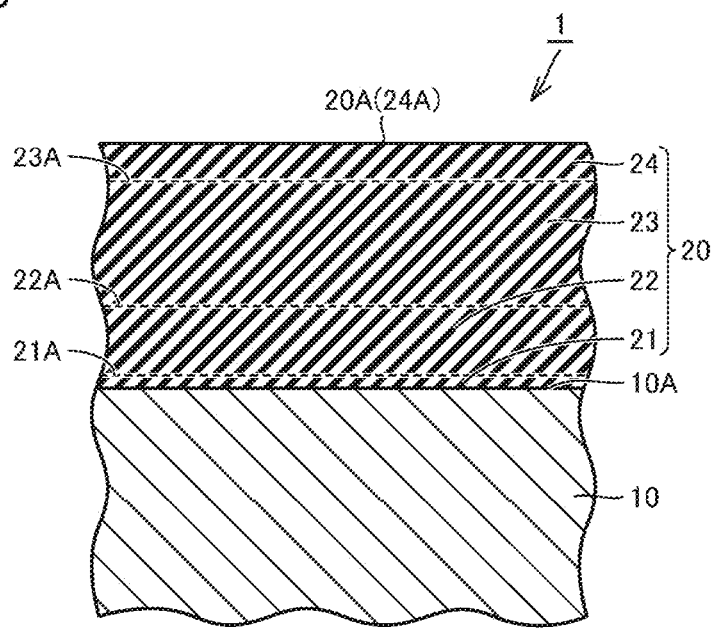
FIG. 3 is a schematic cross-sectional view showing the structure of an oxidized layer of the spring steel wire.

The structure of the oxidized layer 20 will be described below in detail. FIG. 3 is a schematic cross-sectional view showing the structure of the oxidized layer 20 of the spring steel wire 1. Referring to FIG. 3, the oxidized layer 20 covers the entirety of the outer peripheral surface 10A of the main body 10. The oxidized layer 20 is in contact with the outer peripheral surface 10A of the main body 10. The oxidized layer 20 contains 60 mass % or more $Fe_3O_4$.

The oxidized layer 20 includes a FeO layer 21, a first $Fe_3O_4$ layer 22, a second $Fe_3O_4$ layer 23, and a $Fe_2O_3$ layer 24. The FeO layer 21 is disposed on the outer peripheral surface 10A of the main body 10. The FeO layer 21 is in contact with the outer peripheral surface 10A of the main body 10. The first $Fe_3O_4$ layer 22 is disposed on an outer peripheral surface 21A of the FeO layer 21. The first $Fe_3O_4$ layer 22 is in contact with the outer peripheral surface 21A of the FeO layer 21. The first $Fe_3O_4$ layer 22 surrounds the entire perimeter of the outer peripheral surface 10A of the main body 10. The FeO layer 21 is located between the first $Fe_3O_4$ layer 22 and the main body 10.

The second $Fe_3O_4$ layer 23 is disposed on an outer peripheral surface 22A of the first $Fe_3O_4$ layer 22. The second $Fe_3O_4$ layer 23 is in contact with the outer peripheral surface 22A of the first $Fe_3O_4$ layer 22. The second $Fe_3O_4$ layer 23 is in contact with the entirety of the outer peripheral surface 22A of the first $Fe_3O_4$ layer 22. The second $Fe_3O_4$ layer 23 surrounds the entire perimeter of the outer peripheral surface 10A of the main body 10 and the outer peripheral surface 22A of the first $Fe_3O_4$ layer 22.

The $Fe_2O_3$ layer 24 is disposed on an outer peripheral surface 23A of the second $Fe_3O_4$ layer 23. The $Fe_2O_3$ layer 24 is in contact with the outer peripheral surface 23A of the second $Fe_3O_4$ layer 23. The $Fe_2O_3$ layer 24 may cover the entirety or a part of the outer peripheral surface 23A of the second $Fe_3O_4$ layer 23. The $Fe_2O_3$ layer 24 is not an indispensable element to the spring steel wire of the present disclosure and does not have to be present. The $Fe_2O_3$ layer 24 has its outer peripheral surface 24A constituting the outer peripheral surface 20A of the oxidized layer 20, or, the outer peripheral surface of the spring steel wire 1. In the case where the $Fe_2O_3$ layer 24 is present on a part of the outer peripheral surface 23A of the second $Fe_3O_4$ layer 23, in a part of the outer peripheral surface 23A of the second $Fe_3O_4$ layer 23 on which no $Fe_2O_3$ layer 24 is present, the outer peripheral surface 23A of the second $Fe_3O_4$ layer 23 constitutes the outer peripheral surface 20A of the oxidized layer 20, or, the outer peripheral surface of the spring steel wire 1. When there is no $Fe_2O_3$ layer 24, the outer peripheral surface 23A of the second $Fe_3O_4$ layer 23 is the outer peripheral surface 20A of the oxidized layer 20, or, the outer peripheral surface of the spring steel wire 1.

The first $Fe_3O_4$ layer 22 has a Si concentration that is higher than the Si concentration of the second $Fe_3O_4$ layer 23 and the Si concentration of the main body 10. The Si concentration of the first $Fe_3O_4$ layer 22 is, for example, not less than 2.5 mass % and not more than 6 mass %. The first $Fe_3O_4$ layer 22 has a Cr concentration of, for example, not less than 1.5 mass % and not more than 3 mass %.

In the spring steel wire 1 of the present embodiment, the outer peripheral surface 10A of the main body 10 having the pearlite structure is covered with the oxidized layer 20 having a thickness of not less than 2 μm and not more than 5 μm. The oxidized layer 20 contains 60 mass % or more $Fe_3O_4$. This suppresses the peeling of the oxidized layer 20 from the main body 10 having the pearlite structure and ensures high lubricity at the time of coiling the spring steel wire 1 into a spring. As a result, the spring steel wire 1 is a spring steel wire of hard-drawn wire that ensures excellent lubricity during the coiling process.

The oxidized layer 20 of the present embodiment includes the first $Fe_3O_4$ layer 22, and the second $Fe_3O_4$ layer 23 which covers the outer peripheral surface 22A of the first $Fe_3O_4$ layer 22. The Si concentration of the first $Fe_3O_4$ layer 22 is higher than the Si concentration of the second $Fe_3O_4$ layer 23 and the Si concentration of the main body 10. Providing such a first $Fe_3O_4$ layer 22 is not indispensable to the spring steel wire of the present disclosure. However, the presence of such a first $Fe_3O_4$ layer 22 further suppresses the peeling of the oxidized layer 20 from the main body 10.

The oxidized layer 20 of the present embodiment includes the FeO layer 21 between the first $Fe_3O_4$ layer 22 and the main body 10. Although the presence of the FeO layer 21 is not indispensable to the spring steel wire of the present disclosure, the state of oxidation to the extent that the FeO layer 21 is formed between the first $Fe_3O_4$ layer 22 and the main body 10 suppresses formation of the $Fe_2O_3$ layer 24 that peels off easily. The percentage of the FeO layer 21 in the oxidized layer 20 is, for example, not more than 5 mass %. The percentage of the FeO layer 21 in the oxidized layer 20 is preferably not more than 1 mass %, and more preferably not more than 0.1 mass %.

In the spring steel wire 1 of the present embodiment, the first $Fe_3O_4$ layer may have a thickness of not less than 0.3 μm and not more than 1.5 μm. This can further suppress the peeling of the oxidized layer 20 from the main body 10.

Figure 4:
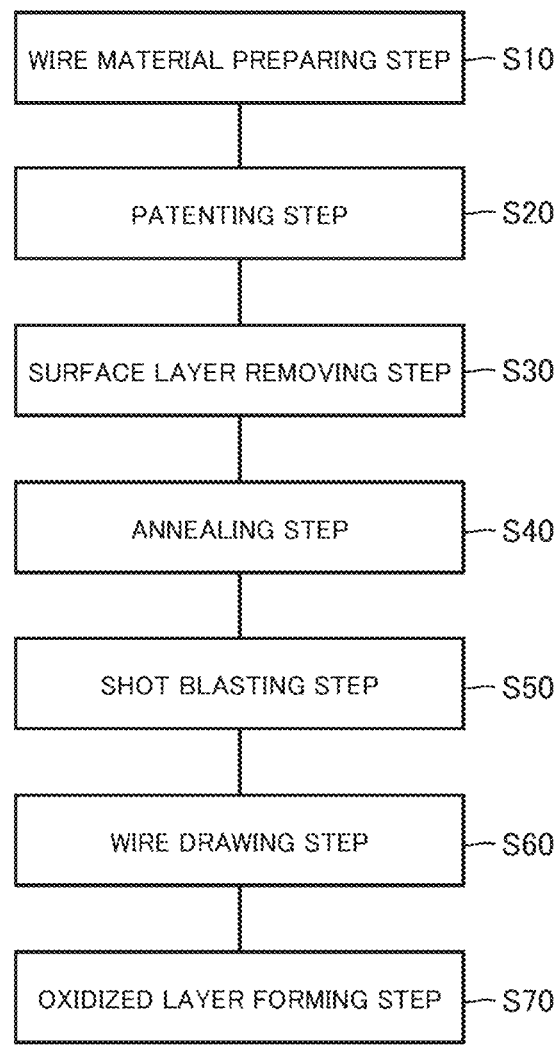
FIG. 4 is a flowchart schematically illustrating a method of producing a spring steel wire.

An exemplary method of producing the spring steel wire 1 will now be described with reference to FIG. 4. FIG. 4 is a flowchart schematically illustrating the method of producing the spring steel wire 1 of the present embodiment. Referring to FIG. 4, in the method of producing the spring steel wire 1 in the present embodiment, firstly, a wire material preparing step is performed as a step S10. In the step S10, a wire material of steel is prepared, wherein the steel contains not less than 0.5 mass % and not more than 0.7 mass % C, not less than 1.0 mass % and not more than 2.5 mass % Si, not less than 0.2 mass % and not more than 1.0 mass % Mn, and not less than 0.5 mass % and not more than 2.0 mass % Cr, with the balance being Fe and unavoidable impurities.

Next, referring to FIG. 4, a patenting step is performed as a step S20. In the step S20, referring to FIG. 4, the wire material prepared in the step S10 is subjected to patenting. Specifically, the wire material is subjected to heat treatment in which the wire material is heated to a temperature range not lower than the austenitizing temperature ($A_1$ point), and then rapidly cooled to a temperature range higher than the martensitic transformation start temperature ($M_s$ point) and held in the temperature range. With this, the wire material attains a fine pearlite structure with small lamellar spacing. Here, in the patenting processing, the process of heating the wire material to the temperature range not lower than the $A_1$ point is preferably performed in an inert gas atmosphere from the standpoint of suppressing the occurrence of decarburization.

Next, referring to FIG. 4, a surface layer removing step is performed as a step S30. In the step S30, a surface layer of the wire material having undergone the patenting in the step S20 is removed. Specifically, the wire material is passed through a shaving die, for example, whereby a decarburized layer or the like on the surface formed through the patenting is removed. Although this step is not an indispensable step, even if a decarburized layer or the like is formed on the surface due to the patenting, such a layer can be removed by performing this step.

Next, an annealing step is performed as a step S40. In the step S40, the wire material with its surface layer removed in the step S30 is subjected to annealing. Specifically, the wire material is subjected to heat treatment in which the wire material is heated to a temperature range not lower than 600° C. and not higher than 700° C. in an inert gas (such as nitrogen or argon gas) atmosphere, for example, and held for a period of not shorter than one hour and not longer than ten hours. While annealing is a heat treatment performed for softening a wire material, in the present embodiment, an oxidized layer 20 is formed and the structure in the oxidized layer 20 is adjusted in this step S40.

In the present embodiment, the above-described heat treatment performed in the step S40 oxidizes the surface portion of the wire material, thereby forming an oxidized layer 20. The region that has not become the oxidized layer 20 constitutes the main body 10 (see FIG. 2 and others). Here, from the standpoint of simply forming an oxidized layer 20 with a high percentage of $Fe_3O_4$, heat treatment may be performed to heat the wire material to about 600° C. in a nitrogen atmosphere, for example. This will form the oxidized layer 20 with a high percentage of $Fe_3O_4$ as the surface portion is oxidized with the oxygen contained as impurities in the nitrogen, argon, or other inert gas, as well as the oxygen inevitably entering into the heat treatment furnace. However, the oxidized layer 20 of the present embodiment should be thick, with a thickness of not less than 2 μm and not more than 5 μm. Further, the oxidized layer 20 of the present embodiment should include the first $Fe_3O_4$ layer having a high Si concentration. From the standpoint of forming such an oxidized layer 20, the heating temperature and the atmosphere in the furnace need to be controlled. Although the atmosphere in the furnace is highly influential, possibly causing conditions to vary by facility, the heating temperature is set to be higher than usual, to be not lower than 650° C. and preferably not lower than 680° C. As to the atmosphere as well, instead of the usual inert gas atmosphere, an atmosphere in which the inert gas is intentionally mixed with the air, or an atmosphere in which the inert gas is mixed with water vapor may be used. Doing as above makes it possible to form an oxidized layer 20 with desired composition and structure.

Next, a shot blasting step is performed as a step S50. In the step S50, the wire material having undergone the annealing processing in the step S40, with the oxidized layer 20 formed thereon, is subjected to shot blasting. Although the step is not indispensable, performing this step can remove the brittle $Fe_2O_3$ layer 24 formed on the surface of the oxidized layer 20 and can also adjust the percentages of FeO, $Fe_3O_4$, and $Fe_2O_3$ in the oxidized layer 20. More specifically, the shot blasting is adjusted in intensity and time so that the $Fe_2O_3$ layer 24 is removed from the oxidized layer 20, with the first $Fe_3O_4$ layer 22 and the second $Fe_3O_4$ layer 23 kept remained.

Next, a wire drawing step is performed as a step S60. In the step S50, the wire material having undergone the shot blasting in the step S50 is subjected to wire drawing process (drawing process). The degree of processing (reduction of area) in the wire drawing process in the step S60 may be set as appropriate; for example, the reduction of area may be set to be not less than 60% and not more than 80%. Here, the "reduction of area" relates to a cross section perpendicular to the longitudinal direction of the wire material, and refers to a value, expressed in percentage, obtained by dividing a difference between the cross-sectional areas before and after the wire drawing process by the cross-sectional area before the wire drawing process.

Next, an oxidized layer forming step is performed as a step S70. In the step S70, the wire material (steel wire) having undergone the wire drawing process in the step S60 is subjected to heat treatment for further forming the oxidized layer 20. In the case where the oxidized layer 20 has been formed as desired in the step S40, this step S70 can be omitted. The step S70 is performed when the oxidized layer 20 formed in the step S40 is insufficient in thickness, or when the composition and/or structure of the oxidized layer 20 needs to be adjusted. The heat treatment conditions in the step S70 are the same as those in the step S40.

The spring steel wire 1 according to the present embodiment is produced through the above-described procedure. In particular, performing the steps S40 and S70 as appropriate can produce the spring steel wire 1 having the oxidized layer 20 with desired thickness, composition, and structure.

Embodiment 2

Figure 5:
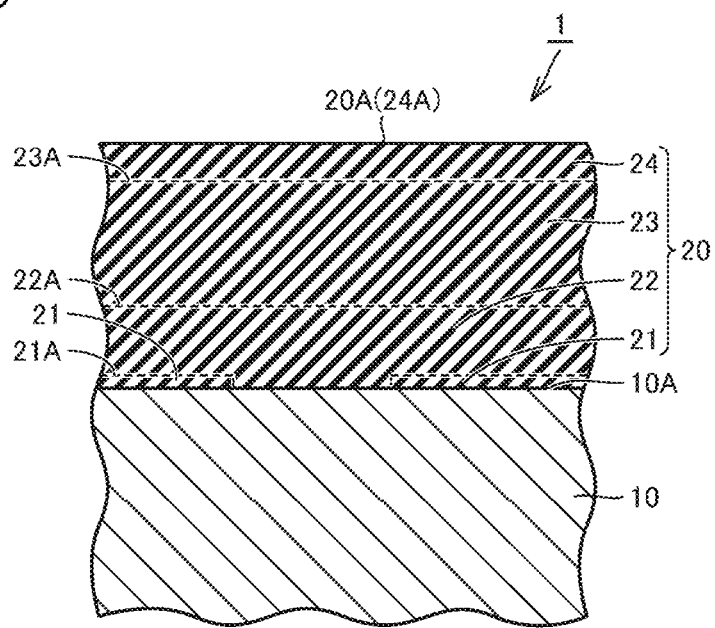
FIG. 5 is a schematic cross-sectional view showing the structure of an oxidized layer of a spring steel wire according to Embodiment 2.

Another embodiment, Embodiment 2, will now be described. The spring steel wire of Embodiment 2 basically has a similar structure and similar effects as that of Embodiment 1. The spring steel wire of Embodiment 2 differs from that of Embodiment 1 in the structure of the oxidized layer. FIG. 5 is a schematic cross-sectional view showing the structure of the oxidized layer of the spring steel wire in Embodiment 2.

Referring to FIG. 5, in the spring steel wire 1 of Embodiment 2, the FeO layer 21 partially covers the outer peripheral surface 10A of the main body 10. In the portion of the main body 10 where its outer peripheral surface 10A is not covered with the FeO layer 21, the main body 10 and the first $Fe_3O_4$ layer 22 are in contact with each other. The region where the main body 10 and the first $Fe_3O_4$ layer 22 contact each other formed in this manner further suppresses the peeling of the oxidized layer 20 from the main body 10.

It should be noted that the oxidized layer 20 in Embodiment 2 can be formed by adjusting the heat treatment conditions in the steps S40 and S70 in the producing method in Embodiment 1 above.

Examples (Experiment 1)

An experiment was conducted to investigate the relationship between the thickness of the oxidized layer and the yield when coiling the wire into a spring. The spring steel wire was prepared in a similar procedure as in Embodiment 1 above. At this time, the heating temperature in the step S40 was set to be 700° C., and the heating time was adjusted to vary the thickness of the oxidized layer within the range of 0.3 μm to 6.5 μm to prepare samples A to E. To obtain the thickness of the oxidized layer, the cross section perpendicular to the longitudinal direction was observed using a scanning electron microscope (SEM), and an average of the thicknesses in four places on diameters orthogonal to each other was calculated. The spring steel wire had a diameter of 1.2 mm. The samples A to E were coiled into a spring using a coiling machine. The spring had a coil outer diameter of 7 mm, the effective number of turns of 12, and a free length of 32 mm. For each sample, 100 springs were prepared. As the coiling machine, VF-720ST manufactured by Shinko Machinery Co., Ltd. was used.

For the obtained springs, the yield was calculated by rejecting those with a difference of more than 0.5 mm from the target value of free length (32 mm) and those with seizing observed on the surface. Here, the "free length" refers to the total length of the spring in the state where no load is applied to the spring. The experimental results are shown in Table 1.

TABLE 1

|   | Thickness of Oxidized Layer (μm) | Surface Condition | Yield (%) |
|---|---|---|---|
| A | 0.3 | Seizing observed | 73 |
| B | 1.2 | Seizing observed | 81 |
| C | 2.2 | Good | 96 |
| D | 4.5 | Good | 95 |
| E | 6.5 | Seizing observed | 83 |

Referring to Table 1, for the samples C and D with the oxidized layer having a thickness of not less than 2 μm and not more than 5 μm, the surface condition was good, and a high yield was secured. On the other hand, for the samples A, B, and E with the oxidized layer having a thickness falling outside the range of not less than 2 μm and not more than 5 μm, seizing occurred on the surface, resulting in a lower yield. In the samples A and B with a thin oxidized layer, the seizing occurred conceivably due to insufficient lubricity obtained by the oxidized layer. On the other hand, in the sample E with a thick oxidized layer, the occurrence of local peeling of the oxidized layer conceivably caused the seizing.

The above experimental results demonstrate that the oxidized layer should have a thickness of not less than 2 μm and not more than 5 μm.

(Experiment 2)

Figure 6:
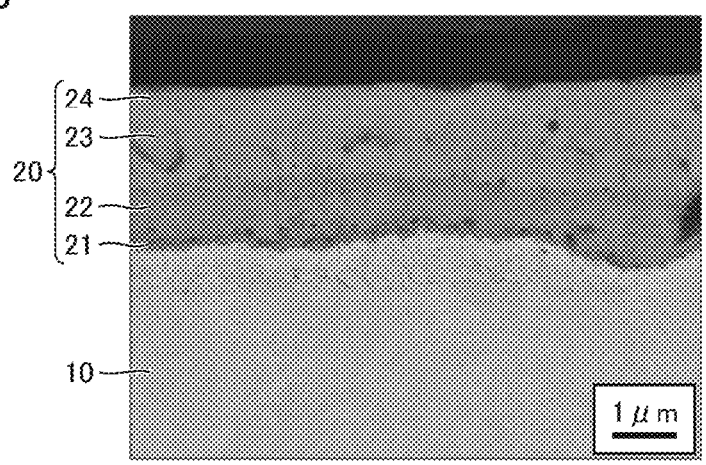
FIG. 6 is an SEM photograph of the oxidized layer.

An experiment was conducted to confirm the effects of forming the first $Fe_3O_4$ layer having a high Si concentration. The spring steel wire was prepared in a similar manner as in Experiment 1 above, and the yield and the surface conditions when forming the springs were investigated. In Experiment 2, the heating temperature in the heat treatment in the step S40 was set to be 750° C. or 800° C., and in the state of increased diffusion rate of Si and other elements in the steel, the heating time was adjusted to thereby adjust the thickness of the first $Fe_3O_4$ layer. The thickness of the first $Fe_3O_4$ layer was measured using an SEM. FIG. 6 shows an example of SEM observation. Measurement using an energy dispersive spectrometer (EDS) confirmed that the oxidized layer 20 in FIG. 6 included the FeO layer 21, the first $Fe_3O_4$ layer 22, the second $Fe_3O_4$ layer 23, and the $Fe_2O_3$ layer 24, and that the first $Fe_3O_4$ layer 22 had a Si concentration higher than those in the main body 10 and the second $Fe_3O_4$ layer 23. The experimental results are shown in Table 2.

TABLE 2

|   | Thickness of Oxidized Layer (μm) | Thickness of First $Fe_3O_4$ Layer (μm) | Surface Condition | Yield (%) |
|---|---|---|---|---|
| F | 2.2 | 0.2 | Good | 96 |
| G | 2.1 | 1.1 | Good | 98 |
| H | 2.2 | 2.2 | Good | 98 |
| I | 6.5 | 0.3 | Seizing observed | 83 |
| J | 6.3 | 1.2 | Good | 85 |
| K | 6.4 | 2.4 | Good | 85 |

Referring to Table 2, in samples F to H with the oxidized layer having a thickness of not less than 2 μm and not more than 5 μm, a further improvement of the yield than in Experiment 1 was confirmed. In samples I to K with the oxidized layer having a thickness exceeding 5 μm as well, the occurrence of seizing would likely be suppressed, leading to an improved yield. This can be presumably because the formation of the first $Fe_3O_4$ layer 22 has suppressed the peeling of the oxidized layer 20 from the main body 10.

(Experiment 3)

An experiment was conducted to investigate the relationship between the composition of the oxidized layer and the yield. The spring steel wire was prepared in a similar manner as in Experiment 1 above, and the yield and the surface conditions when forming the springs were investigated. In Experiment 3, the atmosphere in the heat treatment in the step S40 was changed so as to change the composition of the oxidized layer. Specifically, in a sample L, the air was intentionally mixed in the atmosphere to increase the oxygen partial pressure, to thereby accelerate the oxidation. On the other hand, in a sample N, an inert gas was flowed into the furnace to decrease the oxygen partial pressure, to thereby suppress the oxidation. The composition of the oxidized layer was analyzed using a reference intensity ratio (RIR) method that uses X ray diffraction. Specifically, a sample was prepared by cutting the spring steel wire to a length of about 2 cm and arranging two or three of the cut wires side by side. As an X-ray source, a copper tube bulb was used taking into account the depth of penetration of the X ray into the sample. A wide-angle measurement was conducted using a parallel beam method (with the X-ray irradiation area being a square of about 15 mm per side), to obtain the mass ratio ($FeO:Fe_3O_4:Fe_2O_3$; in mass %) of the oxides from the intensity ratios of the diffraction peaks. The experimental results are shown in Table 3.

TABLE 3

|   | Thickness of Oxidized Layer (μm) | Composition of Oxidized Layer $FeO:Fe_3O_4:Fe_2O_3$ (mass ratio) | Surface Condition | Yield (%) |
|---|---|---|---|---|
| L | 2.2 | 3:72:25 | Good | 88 |
| M | 2.2 | 6:88:6 | Good | 96 |
| N | 2.1 | 35:60:5 | Good | 93 |

Referring to Table 3, in the sample L obtained by accelerating the oxidation, $Fe_2O_3$ advanced in oxidation than $Fe_3O_4$ increased in percentage. On the other hand, in the sample N obtained by suppressing the oxidation, FeO less advanced in oxidation than $Fe_3O_4$ increased in percentage. Although the surface conditions were good in all the samples, the yield was reduced in both samples L and N compared to the sample M. This can be considered to suggest that although there was no seizing yet, slight adhesion had occurred between the spring steel wire and the working tool during the coiling process.

More specifically, in the sample L with a high percentage of $Fe_2O_3$, the brittle $Fe_2O_3$ layer 24 is formed on the surface of the oxidized layer 20, resulting in the lowest yield. On the other hand, in the sample N with a high percentage of FeO, the yield is decreased compared to the sample M, although it is better than the yield of the sample L having the brittle $Fe_2O_3$ layer 24 formed on the surface of the oxidized layer 20. It can be said from the foregoing that the percentage of $Fe_3O_4$ is preferably high in the oxidized layer, which is preferably not less than 80 mass %, for example. It can also be said that the percentage of $Fe_2O_3$ is preferably low in the oxidized layer, which is preferably not more than 10 mass %, for example.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: spring steel wire; 10: main body; 10A: outer peripheral surface; 20: oxidized layer; 20A: outer peripheral surface; 21: FeO layer; 21A: outer peripheral surface; 22: first $Fe_3O_4$ layer; 22A: outer peripheral surface; 23: second $Fe_3O_4$ layer; 23A: outer peripheral surface; 24: $Fe_2O_3$ layer; 24A: outer peripheral surface; φ: diameter of spring steel wire; and t: thickness of oxidized layer.

The invention claimed is:

1. A spring steel wire comprising:
a main body made of a steel and having a line shape; and
an oxidized layer covering an outer peripheral surface of the main body;
the steel constituting the main body containing not less than 0.5 mass % and not more than 0.7 mass % C, not less than 1 mass % and not more than 2.5 mass % Si, not less than 0.2 mass % and not more than 1 mass % Mn, and not less than 0.5 mass % and not more than 2 mass % Cr, with the balance being Fe and unavoidable impurities,
the steel constituting the main body having a pearlite structure,
the oxidized layer having an average thickness of more than 2 μm and not more than 5 μm,
the oxidized layer containing not less than 60 mass % $Fe_3O_4$.

2. The spring steel wire according to claim 1, wherein the oxidized layer includes
a first $Fe_3O_4$ layer, and
a second $Fe_3O_4$ layer covering an outer peripheral surface of the first $Fe_3O_4$ layer,
the first $Fe_3O_4$ layer having a Si concentration higher than a Si concentration of the second $Fe_3O_4$ layer and a Si concentration of the main body.

3. The spring steel wire according to claim 2, wherein the oxidized layer further includes a FeO layer between the first $Fe_3O_4$ layer and the main body.

4. The spring steel wire according to claim 3, wherein
the FeO layer partially covers the outer peripheral surface of the main body, and
in a portion of the main body where the outer peripheral surface thereof is not covered with the FeO layer, the main body and the first $Fe_3O_4$ layer are in contact with each other.

5. The spring steel wire according to claim 2, wherein the first $Fe_3O_4$ layer has a Si concentration of not less than 2.5 mass % and not more than 6 mass % and a Cr concentration of not less than 1.5 mass % and not more than 3 mass %.

6. The spring steel wire according to claim 2, wherein the first $Fe_3O_4$ layer has a thickness of not less than 0.3 μm and not more than 1.5 μm.

7. A spring steel wire comprising:
a main body made of a steel and having a line shape; and
an oxidized layer covering an outer peripheral surface of the main body;
the steel constituting the main body containing not less than 0.5 mass % and not more than 0.7 mass % C, not less than 1 mass % and not more than 2.5 mass % Si, not less than 0.2 mass % and not more than 1 mass % Mn, and not less than 0.5 mass % and not more than 2 mass % Cr, with the balance being Fe and unavoidable impurities,
the steel constituting the main body having a pearlite structure,
the oxidized layer having a thickness of not less than 2 μm and not more than 5 μm,
the oxidized layer containing not less than 60 mass % $Fe_3O_4$, wherein
the oxidized layer includes
a first $Fe_3O_4$ layer,
a second $Fe_3O_4$ layer covering an outer peripheral surface of the first $Fe_3O_4$ layer, and
a FeO layer between the first $Fe_3O_4$ layer and the main body, wherein
the first $Fe_3O_4$ layer has a Si concentration higher than a Si concentration of the second $Fe_3O_4$ layer and a Si concentration of the main body,
the FeO layer partially covers the outer peripheral surface of the main body,
in a portion of the main body where the outer peripheral surface thereof is not covered with the FeO layer, the main body and the first $Fe_3O_4$ layer are in contact with each other,
the first $Fe_3O_4$ layer has a Si concentration of not less than 2.5 mass % and not more than 6 mass % and a Cr concentration of not less than 1.5 mass % and not more than 3 mass %, and
the first $Fe_3O_4$ layer has a thickness of not less than 0.3 μm and not more than 1.5 μm.

* * * * *